US011919612B2

(12) United States Patent
Swider et al.

(10) Patent No.: US 11,919,612 B2
(45) Date of Patent: Mar. 5, 2024

(54) VESSEL ENVIRONMENT CONDITION ASSESSMENT SYSTEM AND METHOD

(71) Applicant: Kongsberg Maritime AS, Kongsberg (NO)

(72) Inventors: Anna Swider, Kongsberg (NO); Are Folkestad, Kongsberg (NO)

(73) Assignee: Kongsberg Maritime AS, Kongsberg (NO)

( * ) Notice: Subject to any disclaimer, the term of this patent is extended or adjusted under 35 U.S.C. 154(b) by 260 days.

(21) Appl. No.: 17/416,107

(22) PCT Filed: Dec. 19, 2019

(86) PCT No.: PCT/NO2019/050283
§ 371 (c)(1),
(2) Date: Jun. 18, 2021

(87) PCT Pub. No.: WO2020/130847
PCT Pub. Date: Jun. 25, 2020

(65) Prior Publication Data
US 2022/0073172 A1 Mar. 10, 2022

(30) Foreign Application Priority Data
Dec. 20, 2018 (NO) .................................. 20181654

(51) Int. Cl.
*B63B 79/15* (2020.01)
*G01P 13/00* (2006.01)
(Continued)

(52) U.S. Cl.
CPC .............. *B63B 79/15* (2020.01); *G01P 13/00* (2013.01); *G01W 1/00* (2013.01); *G05D 1/0875* (2013.01)

(58) Field of Classification Search
CPC ......... B63B 79/15; B63B 79/00; B63B 79/20; B63B 79/30; B63B 79/40; B63H 25/42;
(Continued)

(56) References Cited

U.S. PATENT DOCUMENTS 5,572,765 A * 11/1996 Guell .................... B60S 1/3805
219/202
9,593,522 B1 3/2017 Murar et al.
(Continued)

FOREIGN PATENT DOCUMENTS

CN 101793521 B 10/2012
DE 102010015359 A1 10/2011
(Continued)

OTHER PUBLICATIONS

Extended European Search Report for International Patent Application No. PCT/NO2019/050283, dated Aug. 31, 2022 (7 pages).
(Continued)

*Primary Examiner* — Daniel R Miller
*Assistant Examiner* — Eric Sebastian Von Wald
(74) *Attorney, Agent, or Firm* — ARENTFOX SCHIFF LLP

(57) ABSTRACT

A vessel environment condition assessment system and method, the system comprising a motion measurement unit on board a vessel configured to sense the vessels motion, wherein the motion measurement unit is configured to output a motion signal of the vessel, a processor adapted to receive the motion signal of the vessel, and apply an energy operator to the motion signal to calculate an energy signal representative of the environmental condition for the vessel.

11 Claims, 3 Drawing Sheets

(51) Int. Cl.
  *G01W 1/00* (2006.01)
  *G05D 1/00* (2006.01)
  *G05D 1/08* (2006.01)

(58) Field of Classification Search
  CPC .... G01P 13/00; G01P 13/0013; G01P 13/002; G01W 1/00; G01C 21/20; G01C 21/203; G05D 1/0875; G05D 1/08
  See application file for complete search history.

(56) References Cited

U.S. PATENT DOCUMENTS

| 2014/0316620 | A1 | 10/2014 | Löfgren et al. | |
| 2015/0149135 | A1* | 5/2015 | Tervo | G05B 17/02 |
| | | | | 703/8 |
| 2015/0198950 | A1* | 7/2015 | Kallaway | B63B 27/34 |
| | | | | 701/21 |
| 2017/0075036 | A1* | 3/2017 | Pikhletsky | G01R 33/091 |

FOREIGN PATENT DOCUMENTS

| EP | 1962163 | A1 | | 8/2008 | |
| EP | 2167916 | A2 | | 3/2010 | |
| EP | 1716043 | B1 | * | 10/2010 | B63B 9/001 |
| EP | 2419804 | A1 | | 2/2012 | |
| EP | 2587321 | A1 | * | 5/2013 | G05B 13/042 |
| KR | 20120061104 | A | * | 6/2012 | |
| KR | 20180105921 | A | * | 10/2018 | |
| WO | 2008152613 | A2 | | 12/2008 | |
| WO | 2010118752 | A1 | | 10/2010 | |
| WO | 2015173757 | A1 | | 11/2015 | |

OTHER PUBLICATIONS

Amirat et al., "Wind turbine bearing failure detection using generator stator current homopolar component ensemble empirical mode decomposition," IECON 2012—38th Annual Conference on IEEE Industrial Electronics Society, pp. 3937-3942 (2012).
International Search Report and Written Opinion for International Patent Application No. PCT/NO2019/050283, dated Mar. 17, 2020 (10 pages).
Kvedalen, "Signal processing using the Teager Energy Operator and other nonlinear operators," Cand. Scient Thesis, University of Oslo, Department of Informatics, pp. 1-121 (May 2003).
Fossen et al., "Kalman filtering for positioning and heading control of ships and offshore rigs, estimating the effects of waves, wind, and current," IEEE Control Systems Magazine, pp. 32-46 (Dec. 2009).
Norwegian Search Report for Norwegian Patent Application No. 20181654, dated May 15, 2019 (2 pages).

\* cited by examiner

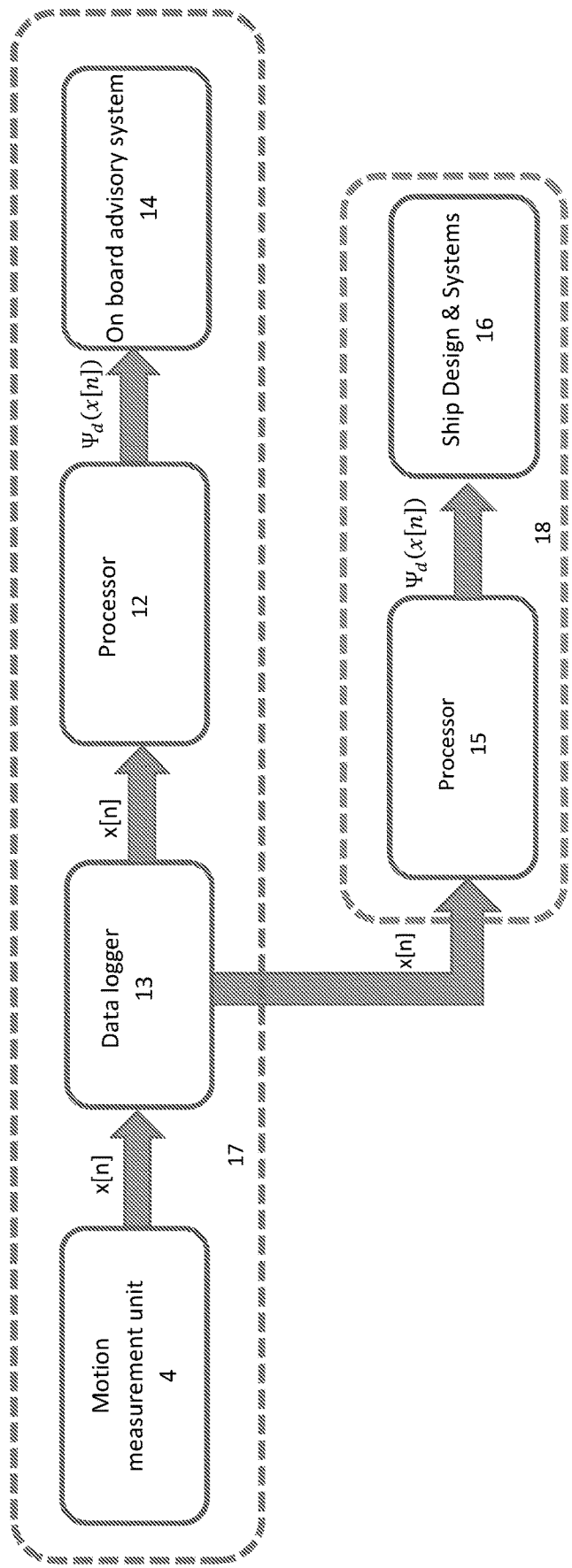

VESSEL ENVIRONMENT CONDITION ASSESSMENT SYSTEM AND METHOD

This application is a 35 U.S.C. § 371 National Phase of PCT Application No. PCT/NO2019/050283, filed on Dec. 19, 2019, which claims priority to Norwegian Patent Application No. 20181654, filed Dec. 20, 2018, the disclosures of each of which are hereby incorporated by reference in their entireties.

TECHNICAL FIELD

The present invention relates to assessment of vessel response to environmental condition. In particular by applying an energy operator to a motion signal to determine an energy signal representative of the environmental condition for the vessel.

BACKGROUND

When vessels are sailing they may experience large variations in sea-states and weather conditions. The energy balance of the power plant of a vessel is effected by the sea-state and weather conditions in which the vessel is operating. Knowledge about environmental conditions may be used to take the influence of weather effect out of the total energy balance analysis in the power system design and to be used in the on-board advisory system. This information is crucial for the power system designers to consider for the dynamic load variations and to properly dimension the system for example for a dynamic positioning (DP) or Transit operations. It is therefore a need for an environmental condition indicator influencing the power and energy used by the vessel. Additionally the knowledge about the environmental condition enables comparing different vessel designs and vessel performance.

The sea state, the general condition of the surface of the open sea, varies over time, and there exist various ways of characterizing sea state by statistics, including various properties of the waves, such as wave height, period, and power spectrum.

Sea state is typically assessed by buoys, wave radars or satellites. Different hydro-mechanical approaches are used, including statistics for characterization of wave height, direction, period, energy spectra etc. Due to the complexity, existing wave measuring sensor systems tend to be costly. The sensor systems may typically make use of different types of gyro sensors, accelerometers etc.

In order to reduce the instrument cost, other methods of identifying the sea state have been researched. This methods estimate the sea state estimation using vessel response, or ship motion response, to the environment. These methods rely on calculating wave spectrums, complex transformation and feature extraction. Due to the complex methodology, the calculation of sea state has required significant processing power, and introduced delays that complicate dynamic positioning operation of vessels.

It is therefore a need for system and method for vessel environment assessment that is simple to implement in a real system, numerically cheap and that introduces little delay.

SHORT SUMMARY

A goal with the present invention is to overcome the problems of prior art, and to disclose a system and a method. The invention solving the above mentioned problems is a vessel environmental condition assessment method and a vessel environmental condition assessment system according to the independent claims.

BRIEF DESCRIPTION OF THE DRAWINGS

FIG. 4 illustrates in a simplified block diagram an embodiment of a vessel environmental condition sensing system.

EMBODIMENTS OF THE INVENTION

In the following description, various examples and embodiments of the invention are set forth in order to provide the skilled person with a more thorough understanding of the invention. The specific details described in the context of the various embodiments and with reference to the attached drawings are not intended to be construed as limitations. Rather, the scope of the invention is defined in the appended claims.

The embodiments described below are numbered. In addition, dependent embodiments defined in relation to the numbered embodiments are described. Unless otherwise specified, any embodiment that can be combined with one or more numbered embodiments may also be combined directly with any of the dependent embodiments of the numbered embodiment(s) referred to.

Figure 1:
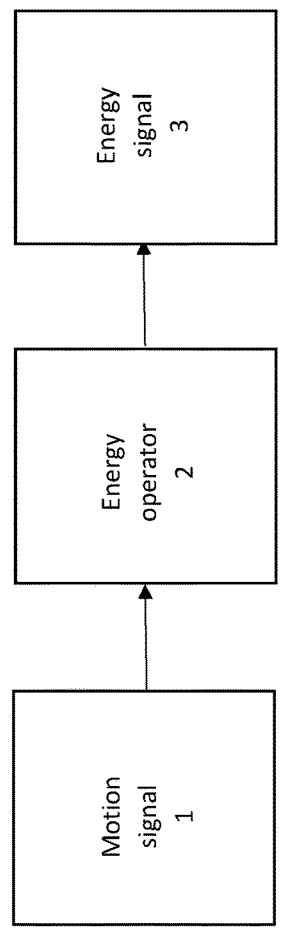
FIG. 1 illustrates in a simplified block diagram an embodiment of a vessel environmental condition sensing method.

With reference to FIG. 1, the invention is in a first embodiment a vessel environmental condition sensing method comprising receiving a motion signal 1 from a motion measurement unit on board a vessel. An energy operator 2 is applied to the motion signal 1 to determine an energy signal 3 representative of the environmental condition for the vessel.

The energy signal describes the dynamics of the motions of a vessel on the sea. The value of the energy signal reflect the vessel's response to the environmental conditions, such as weather and/or wave conditions.

Different vessels may respond differently to the same weather conditions. The value of the energy signal for two different vessels in the same weather conditions may therefore be different for each of the vessels.

In a second embodiment that may be combined with the first embodiment above, the energy operator 2 is the Teager Kaiser (TK) instantaneous energy operator. The TK operator is expressed as $$\Psi_d(x[n]) = x^2[n] - x[n+1]x[n-1]$$

where $\Psi_d(x[n])$ is the TK operator of signal $x[n]$, and $x[n]$ is a discrete time signal. The implementation of the instantaneous energy operator for the discrete signal is simple, numerically cheap and only introduces 1 Sa (sample delay), thus is considered a delay-less solution.

In a third embodiment that may be combined with any of the embodiments above, the method further comprises classifying the energy signal into a plurality of environmental condition classes for the vessel, each environmental condition class being defined by an energy signal threshold value. In one example there are three environmental condition classes, where an energy signal below a first threshold represents good environmental conditions, an energy signal between the first threshold and a second threshold, the second threshold being higher than the first threshold, represents medium environmental conditions, and an energy signal higher than a third threshold, the third threshold being higher than the second threshold, represents bad environmental conditions. However, any number of classes may be used. Exemplary methods of building a classifier based on the energy signals are perceptron or k-means clustering. Any other clustering method applicable may be used.

The motion measurement unit senses the movements of a vessel on which the motion measurement unit is positioned, and translates those movements into an electrical signal. A vessel on sea have six degrees of freedom or motions; three rotational motions, pitch, roll and yaw; and three translational motions, heave, sway and surge. A motion measurement unit comprises one or more movement sensors that measures movement in one or more of those six degrees of freedom. In one embodiment, the motion measurement unit comprises at least one of an inertial measurement unit, an inclinometer or an angular rate sensor.

Figure 2:
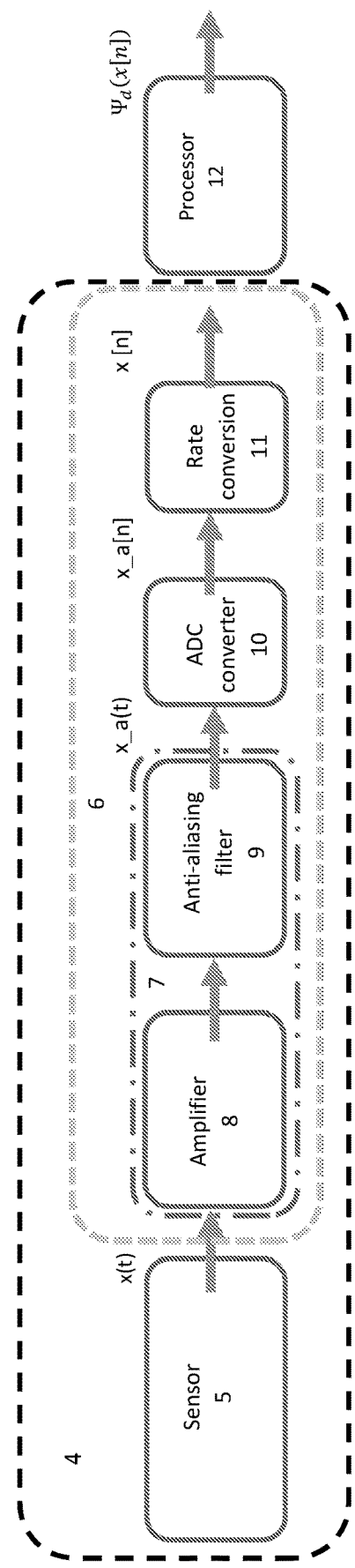
FIG. 2 illustrates in a simplified block diagram an embodiment of a vessel environmental condition sensing method.

With reference to FIG. 2, a motion measurement unit 4 comprises a movement sensor 5. The movement sensor 5 outputs an analog electrical signal, x(t). The analog electrical signal, x(t) then undergoes digital signaling processing (DSP) 6 into a discrete time signal by well-known technologies. The first step is signal conditioning 7, typically using an amplifier 8 and an anti-aliasing filter 9. After the signal conditioning 7, the conditioned analog signal x_a(t) is transformed into a digital sequence by an analog-to-digital converter (ADC) 10. The input to the ADC, x_a(t), is a real-valued function of a continuous variable, t. For each value of t, the function x_a(t) may be any real number. The output of the ADC 10 is a bit stream that corresponds to the discrete-time sequence, x_a[n], with an amplitude that is quantized, for each value of n, to one of a finite number of possible values. After the ADC 10, the digital signal x[n] may be converted from one sampling rate to another sampling rate by a sample rate conversion process 11, e.g. change from a 10 Hz signal to a 1 Hz signal. The sample rate conversion may be performed in the DSP 6 unit and/or in a data logger external to the DSP unit. The energy operator is applied to the discrete motion signal x[n] in a processor 12 to determine an energy signal $\Psi_d(x[n])$.

Figure 3:
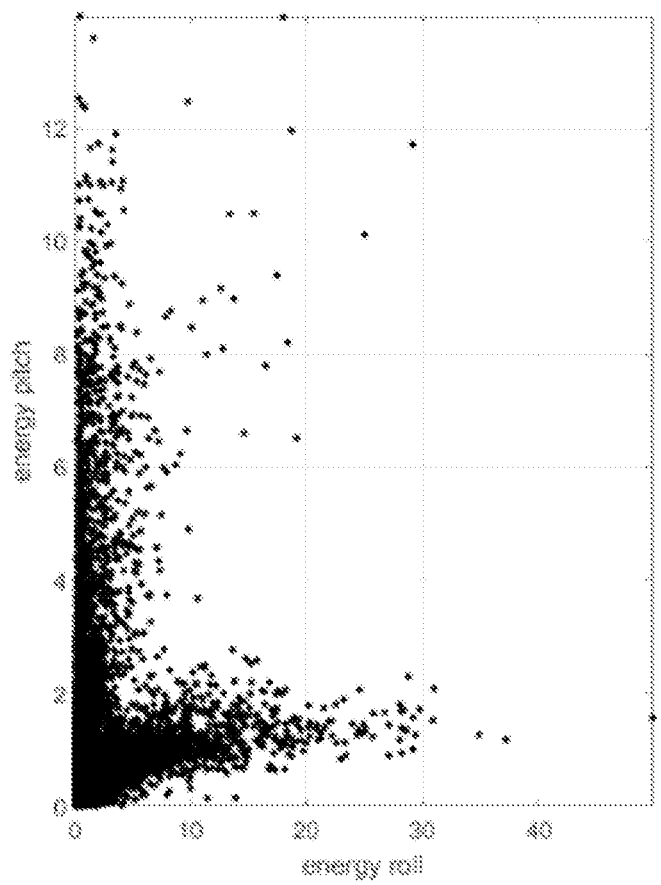
FIG. 3 is an exemplary plot of a determined pitch energy and roll energy for a vessel.

The energy operator is applied to discrete signals of pitch, roll, heave, yaw, surge or sway signals. In a fourth embodiment that may be combined with any of the embodiments above, the motion signal comprises at least one of a pitch, roll, heave, yaw, surge or sway signal, and the energy signal representative of the environmental condition is a pitch energy signal, a roll energy signal, heave energy signal, yaw energy signal, surge energy signal or sway energy signal, respectively. The environmental condition may be classified based on one of pitch energy signal, the roll energy signal, the heave energy signal, the yaw energy signal, the surge energy signal, the sway energy signal, or any combination of them. The pitch energy signal, the roll energy signal, and the heave energy signal are more preferred for determining vessel response on the environmental conditions, and particularly efficient is the pitch energy signal. FIG. 3 is an exemplary plot of determined pitch energy and roll energy for a vessel. As shown in FIG. 3 determining signal energy is particularly efficient to provide a clear separation of the information included in vessel motion measurement, which provides for classification of the vessel response on the environmental conditions. In one related embodiment, the environmental condition is a weather condition.

FIG. 4 illustrates schematically a motion measurement unit 4 positioned on board a vessel 17, The motion measurement unit 4 outputs discrete motion signals x[n]. The discrete motion signals x[n] may be input to a data logger 13 for storage and/or sample rate conversion. The discrete motion signal x[n] is output from the data logger 13 to a computer 12 to apply energy operator to the discrete motion signal x[n] and determine an energy signal $\Psi_d(x[n])$ as described above. The computer 12 may also receive the discrete motion signal x[n] directly from motion measurement unit 4. In one alternative embodiment, the energy signal may be determined on board the vessel and used for on-board advisory systems 14, such as Energy Management where the pitch energy signal may be a Wave Indication input.

The data logger 13 may also be configured to transfer the discrete motion signal x[n] from the vessel 17 to shore 18. The transfer may be performed using any suitable wireless communication, wired connection or physical connection to the data logger 13. On shore, a computer 15 apply the energy operator to the discrete motion signal x[n] and determines an energy signal $\Psi_d(x[n])$ as described above. On shore, the energy signal may also be determined from archived data. Then then energy signal may be used in ship Design & Systems 16 to:

i) compare power consumption when $\Psi_d(x[n])$ is high and low. This makes is it possible to see the influence of the environment for the power consumption, to increase the knowledge about the dynamic environment and its influence for power, what can be included in the power system, vessel design to increase or decrease environmental margins ii) compare different hulls form of vessels, e.g. how different hulls respond on waves in the same environmental conditions. Different values of $\Psi_d(x[n])$ for the same weather conditions indicate properties of the hull forms.

iii) compare one vessel with different draft under the same environment conditions for high and low $\Psi_d(x[n])$.

iv) compare performance of a roll reduction tank.

In a fifth embodiment, the invention is a vessel environment condition assessment system comprising a motion measurement unit 4 on board a vessel 17 configured to sense the vessels motion. The motion measurement unit 4 is configured to output a motion signal 1 of the vessel 17 to a processor 12, 15 adapted to receive the motion signal of the vessel. The processor 12, 15 applies an energy operator 2 to the motion signal 1 to determine an energy signal 3 representative of the environmental condition.

In a related embodiment, the motion measurement unit 4 of the environment condition assessment system comprises at least one of an inertial measurement unit, an inclinometer or an angular rate sensor.

In a sixth embodiment that may be combined with the fifth embodiment, the processor 12, 15 applies a Teager Kaiser energy operator.

In a seventh embodiment, that may be combined with the fifth and sixth embodiment, the processor 12, 15 is further adapted to classifying the energy signal 3 into a plurality of environmental condition classes for the vessel, each environmental condition class defined by an energy signal threshold value. The motion signal 1 of the vessel 17 input to the processor 12, 15 comprises one or more of a pitch signal, roll signal, heave signals, yaw signal, surge signal or sway signal, and the energy signal 3 representative of the environmental condition is a one or more of a pitch energy signal, a roll energy signal, a heave energy signal, a yaw energy signal, a surge energy signal or a sway energy signal. The processor 12, 15 may classify the environmental condition based on one of the pitch energy signal, the roll energy signal, the heave energy signal, the yaw energy signal, the surge energy signal, the sway energy signal, or any combination thereof.

In an eight embodiment, the energy signal 3 may be input to an on-board advisory systems 14 on board the vessel 17.

In a ninth embodiment, the energy signal 3 may be input to a ship design and system 16 on-shore 18.

In the exemplary embodiments, various features and details are shown in combination. The fact that several features are described with respect to a particular example should not be construed as implying that those features by necessity have to be included together in all embodiments of the invention. Conversely, features that are described with reference to different embodiments should not be construed as mutually exclusive. As those with skill in the art will readily understand, embodiments that incorporate any subset of features described herein and that are not expressly interdependent have been contemplated by the inventor and are part of the intended disclosure. However, explicit description of all such embodiments would not contribute to the understanding of the principles of the invention, and consequently some permutations of features have been omitted for the sake of simplicity or brevity.

The invention claimed is:

1. A vessel environmental condition assessment method, comprising:
   providing a vessel environment condition assessment system comprising a processor and a motion measurement unit on board a vessel configured to sense the vessel's motion, wherein the motion measurement unit is configured to output a motion signal of the vessel;
   receiving, by the processor, the motion signal of the vessel;
   applying, by the processor, an energy operator to the motion signal to determine an energy signal representative of the environmental condition for the vessel, wherein the energy operator is a Teager Kaiser energy operator, and
   classifying, by the processor, the energy signal into a plurality of environmental condition classes for the vessel, each environmental condition class defined by an energy signal threshold value.

2. The method according to claim 1, wherein the motion signal of the vessel comprises one or more of a pitch, roll, heave, yaw, surge or sway signal, and the energy signal representative of the environmental condition is a pitch energy signal, a roll energy signal, heave energy signal, yaw energy signal, surge energy signal or a sway energy signal.

3. The method according to claim 2, wherein the environmental condition is classified based on one of the pitch energy signal, the roll energy signal, the heave energy signal, the yaw energy signal, the surge energy signal, the sway energy signal, or any combination thereof.

4. The method according to claim 1, wherein the environmental condition is a weather condition.

5. A vessel environment condition assessment system, comprising;
   a motion measurement unit on board a vessel configured to sense the vessel's motion, wherein the motion measurement unit is configured to output a motion signal of the vessel;
   a processor adapted to:
      receive the motion signal of the vessel;
      apply an energy operator to the motion signal to calculate an energy signal representative of the environmental condition for the vessel, wherein the energy operator is a Teager Kaiser energy operator, and
   wherein processor is further adapted to classifying the energy signal into a plurality of environmental condition classes for the vessel, each environmental condition class defined by an energy signal threshold value.

6. The system according to claim 5, wherein the motion signal of the vessel comprises one or more of a pitch signal, roll signal, heave signal, yaw signal, surge signal or sway signal, and the energy signal representative of the environmental condition is a one or more of a pitch energy signal, a roll energy signal, a heave energy signal, a yaw energy signal, a surge energy signal or a sway energy signal.

7. The system according to claim 6, wherein the environmental condition is classified based on one of the pitch energy signal, the roll energy signal, the heave energy signal, the yaw energy signal, the surge energy signal, the sway energy signal, or any combination thereof.

8. The system according to claim 5, wherein the motion measurement unit comprises at least one of an inertial measurement unit, an inclinometer or an angular rate sensor.

9. The system according to claim 5, wherein the environmental condition is a weather condition.

10. The system according to claim 5, wherein the energy signal is input to an on-board advisory system on board the vessel.

11. The system according to claim 5, wherein the energy signal is input to a ship design and system on-shore.

* * * * *